United States Patent
Lingafelt et al.

(10) Patent No.: US 7,685,246 B2
(45) Date of Patent: Mar. 23, 2010

(54) CONTROL OF AN INSTANT MESSAGE SYSTEM THAT ALLOWS MULTIPLE CLIENTS WITH IDENTICAL CREDENTIALS

(75) Inventors: Charles Steven Lingafelt, Durham, NC (US); David Paul Merrill, New Paltz, NY (US); John Elbert Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 12/018,854

(22) Filed: Jan. 24, 2008

(65) Prior Publication Data

US 2009/0193086 A1 Jul. 30, 2009

(51) Int. Cl.
G06F 15/16 (2006.01)
H04L 9/32 (2006.01)
(52) U.S. Cl. ............... 709/206; 709/228; 709/243; 713/170
(58) Field of Classification Search ........... 709/206, 709/228, 243; 713/170
See application file for complete search history.

(56) References Cited

U.S. PATENT DOCUMENTS

| | | | |
|---|---|---|---|
| 6,983,370 B2 * | 1/2006 | Eaton et al. | 713/182 |
| 7,197,565 B2 | 3/2007 | Abdelaziz et al. | |
| 2005/0102365 A1 | 5/2005 | Moore et al. | |
| 2005/0165920 A1 * | 7/2005 | Kerr et al. | 709/223 |
| 2007/0101009 A1 | 5/2007 | Chen et al. | |
| 2007/0174405 A1 | 7/2007 | Chen et al. | |
| 2007/0185967 A1 | 8/2007 | Hayes | |

* cited by examiner

Primary Examiner—Quang N. Nguyen
Assistant Examiner—Nam Thai
(74) Attorney, Agent, or Firm—Schmeiser, Olsen & Watts; Arthur J. Samodovitz

(57) ABSTRACT

A method and system for improving control of an instant messaging system. Multiple instant message (IM) instances are initiated with identical credentials of a user of multiple users participating in an IM session controlled by an IM server. A front-of-screen representation enables the user to manage instance attributes and allows any user to view conversational connectivity information. The IM server receives the user's selection of a graphical element that represents a remote IM instance of the multiple IM instances. Via the first IM instance, the IM server receives the user's request for a computing device to perform an action that includes an interaction with the remote IM instance. The computing device performing the action is located remotely from the user and is executing the remote IM instance. The action is performed by controlling a remote system function of the computing device.

17 Claims, 10 Drawing Sheets

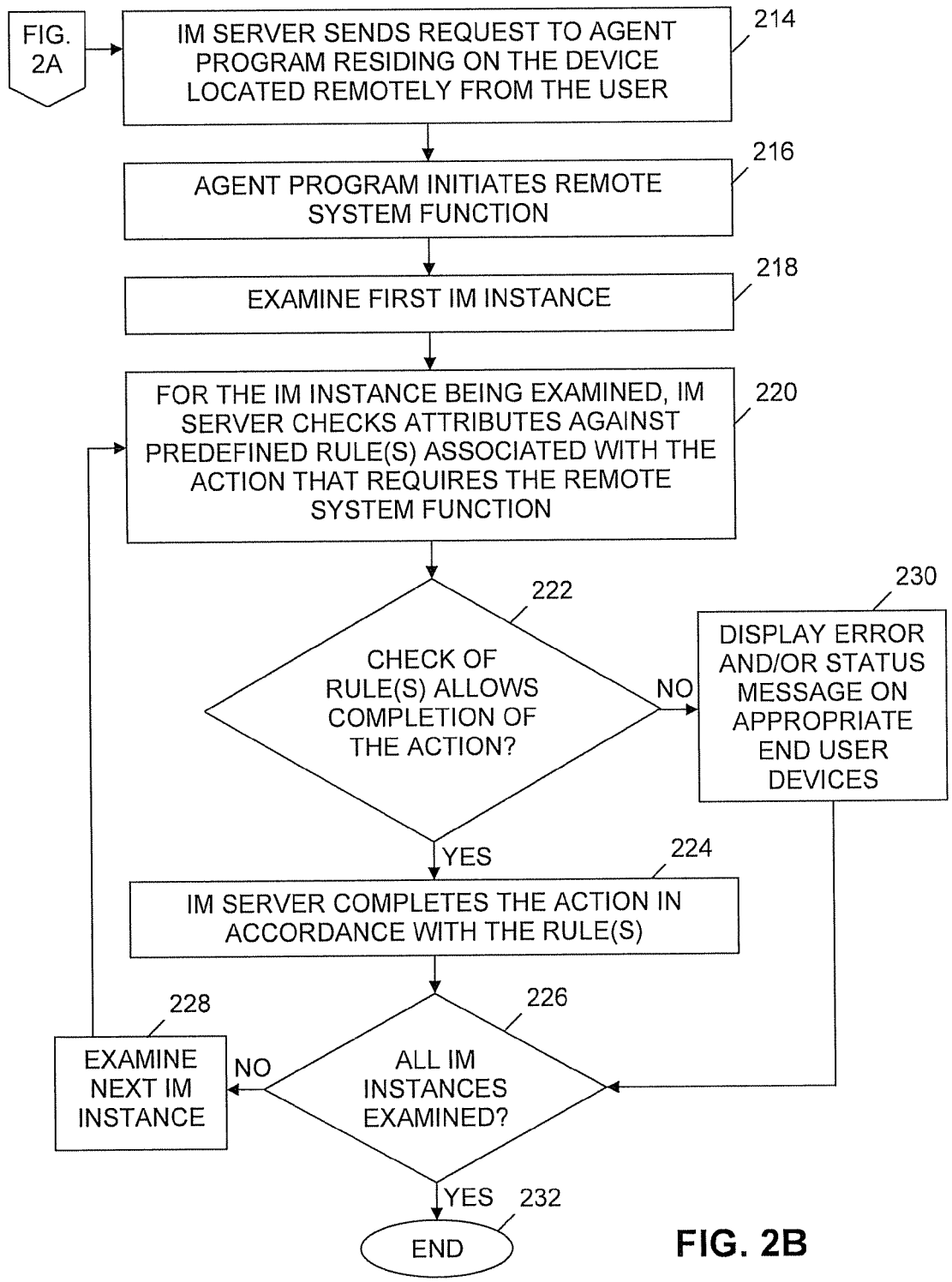

400

| INFORMATION | RULES |
|---|---|
| User-defined location | Do not send secure messages to my basement PC |
| Security | OK to send all messages to a secure IM instance |
| IM Client Type<br>- Cellular<br>- Blackberry<br>- Small display<br>- Dial connected | OK to send any message type to a high bandwidth connected PC, but do not send messages with imbedded images or files to Cellular, Blackberry, and low bandwidth connected devices |

FIG. 4

| IM INSTANCE DEVICE | ALLOWABLE MESSAGE TYPE | MAXIMUM SIZE | MAXIMUM LATENCY | MAXIMUM JITTER | OTHER MESSAGE/META MESSAGE CHARACTERISTICS |
|---|---|---|---|---|---|
| Blackberry1 | .wav, mp3 | 4KB | 500ms | 100ms | From John |
| Phone1 | .doc, mp3 | 1KB | 100ms | 100ms | Not from Dave |
| HD monitor | none | Unlimited | 10000ms | 500ms | -na- |
| Public PC | mp3 | 25KB | 1000ms | 1000ms | Message content not confidential |
| Low bandwidth attached PC | .wav, .mp2, mp3 | 5KB | 9000ms | -na- | 2nd shift only |

CONTROL OF AN INSTANT MESSAGE SYSTEM THAT ALLOWS MULTIPLE CLIENTS WITH IDENTICAL CREDENTIALS

FIELD OF THE INVENTION

The present invention relates to improving computer-based control of an instant messaging system, and more particularly to a technique for improving control of a user's multiple instant message instances located in different physical locations.

BACKGROUND OF THE INVENTION

In a conventional instant messaging system, multiple instant message (IM) instances may log onto an IM session from different physical locations, using the same user's credentials, thereby providing a way to share a message between the multiple instances so that a computing device at each physical location can obtain the same view of the message. Since the user cannot simultaneously be at all of the different physical locations, the user cannot physically control all of the multiple IM instances. Therefore, security of certain IM endpoints is compromised. Unauthorized persons can observe and/or hijack the IM session without the user's knowledge. For example, a user has three instances of an IM session—one at a home office, one at a workplace office location, and one in a conference room, where the user is working. At the conclusion of the conference room meeting, the user closes the conference room instance of IM session, but does not return to the workplace office location and therefore fails to close the workplace office instance of the IM session. The user moves to the home office and conducts confidential business using the home office instance of the IM session. Another person (e.g., a custodian or fellow office worker) who is not authorized to know the confidential business information observes the IM session via the workplace office instance. Furthermore, after the user closes the home office instance, the unauthorized person at the workplace office location hijacks the IM session for his or her own use, or begins a new IM session with other participants and masquerades as the original user (i.e., the true owner of the IM collaboration). Thus, there exists a need to overcome at least one of the preceding deficiencies and limitations of the related art.

SUMMARY OF THE INVENTION

The invention provides a method of improving control of an instant messaging system. A computing system initiates multiple instant message (IM) instances with identical credentials of a first user of multiple users participating in an IM session. The multiple IM instances are included in a group of IM instances of the IM session. The IM instances of the group are being executed on multiple computing devices. The computing system receives, from the first user, via a first IM instance of the multiple IM instances, and subsequent to the initiation of the multiple IM instances, a selection of a graphical element of a group of graphical elements representing the group of IM instances. The graphical element represents a remote IM instance of the multiple IM instances. The remote IM instance is different from the first IM instance. The computing system receives, from the first user, via the first IM instance, and subsequent to the receipt of the selection of the graphical element, a selection of an action of a list of actions. Receiving the selection of the action includes receiving a request to perform the action by a remote computing device of the multiple computing devices. The remote computing device is located remotely from the first user and is executing the remote IM instance. The computing system performs the action. Performing the action includes controlling a remote system function of the remote computing device.

A system and computer program product corresponding to the above-summarized method are also described and claimed herein.

Advantageously, the present invention provides a front-of-screen representation of a user's multiple IM instances. The front-of-screen representation enables the user, from one of the multiple IM instances, to (1) understand the attributes of the other IM instances, (2) view conversational connectivity between participants in the IM session, and (3) control the functions of one of the other IM instances, as if the user was physically present at the other IM instance.

BRIEF DESCRIPTION OF THE DRAWINGS

FIGS. 2A-2B depict a flow diagram of an instant message instances control process implemented in the system of FIG. 1, in accordance with embodiments of the present invention.

FIG. 4 is a table of exemplary rules that are applied to IM attributes and IM instance attributes during the process of FIGS. 2A-2B, in accordance with embodiments of the present invention.

FIG. 6B is a table of exemplary message characteristics and meta message characteristics defined by the process of FIG. 6A, in accordance with embodiments of the present invention.

DETAILED DESCRIPTION OF THE INVENTION

Overview

In an IM collaboration environment in which a user owns multiple IM instances being executed by computing devices in different locations, the present invention provides a front-of-screen representation that includes graphic elements representing the multiple IM instances. The front-of-screen representation enables the user, via a computing device executing one of the multiple IM instances, to view and manage attributes of the multiple IM instances. Further, the front-of-screen representation provides the user with the capability to view conversational connectivity between IM instances that are participating in an IM collaboration. The conversational connectivity is viewable by any participant in the IM collaboration and allows a participant to be aware of multiple computing devices that are executing the multiple IM instances owned by the user. Still further, the front-of-screen representation enables the user to control any IM instance (i.e., a remote IM instance) of the multiple IM instances that is being executed by a computing device located remotely from the user. The control of the remote IM instance includes executing a remote system function of the computing device, such as sending an instant message from the computing device or fetching a computer file from a data repository coupled to the computing device and sending the computer file as an attachment to an instant message. An action that includes executing the remote system function and subsequently sending an IM to a specified computing device is completed if predefined rules applied to attributes of the IM permit the specified computing device to receive the IM.

System for Improving Control of Multiple IM Instances

Figure 1:
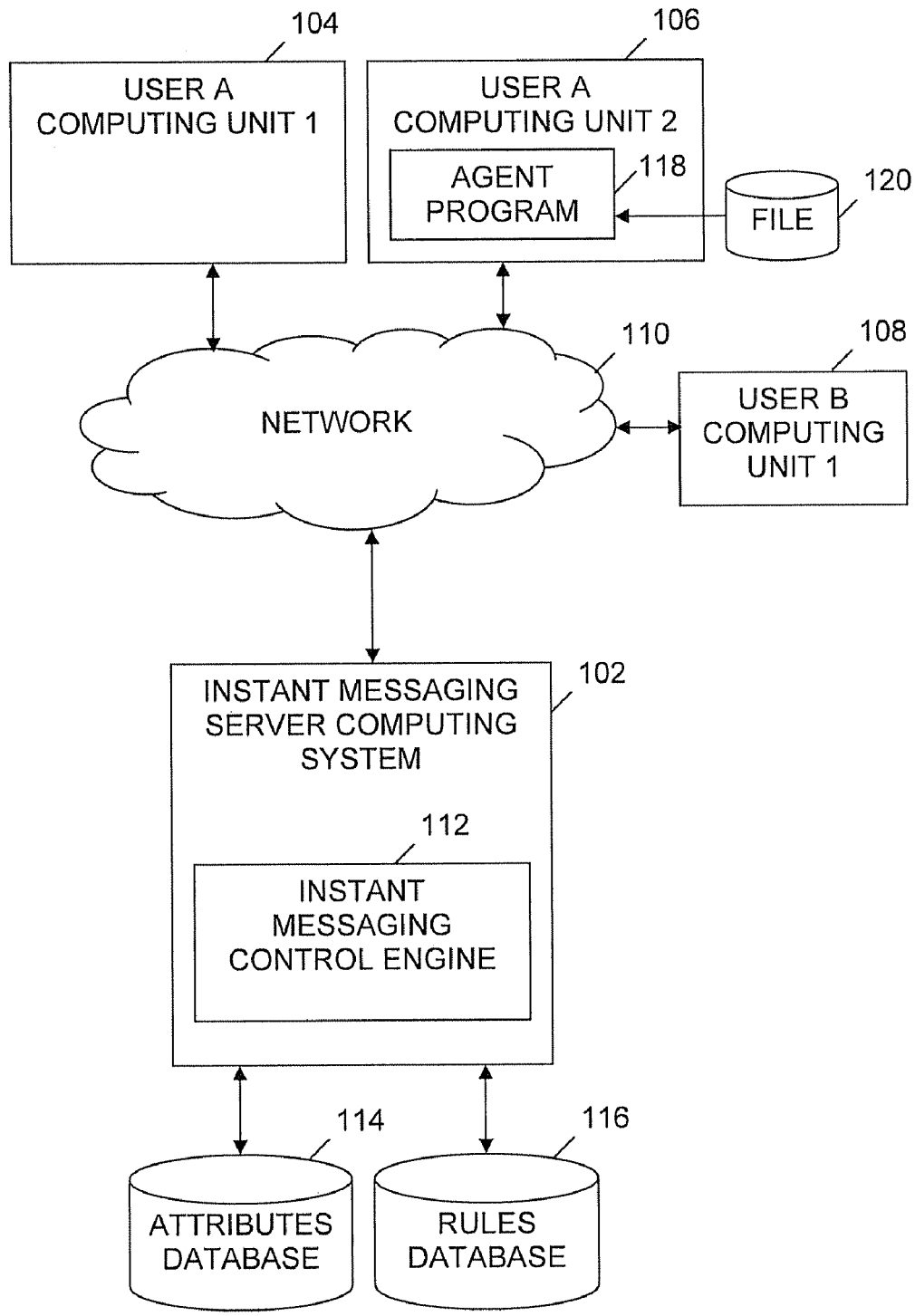
FIG. 1 is a block diagram of a system for improving control of a user's multiple instant message instances located in different physical locations, in accordance with embodiments of the present invention.

FIG. 1 is a block diagram of a system for improving control of a user's multiple IM instances located in different physical locations, in accordance with embodiments of the present invention. System 100 may include an instant messaging server computing system 102 (hereinafter also referred to simply as IM server 102) in communication with multiple user computing units 104, 106, 108 (a.k.a. computing devices, end user devices, IM instance devices, clients or IM clients) via a network 110 (e.g., the Internet). IM server 102 includes a software-based instant messaging control engine 112 that controls a user's multiple IM instances located in different physical locations. An attributes database 114 and a rules database 116 are coupled to IM server 102. Instant messaging control engine 112 accesses attributes from database 114 and rules from database 116 to implement the control of a user's multiple IM instances. User computing unit 106 includes an agent program 118 that fetches a computer file 120 from a data repository coupled to user computing unit 106. Fetching computer file 120 by agent program 118 and sending the computer file to IM instances running on one or more of the multiple user computing devices is an example of a user-requested action that requires controlling a remote system function. In this case, the remote system function provides the fetching of the computer file. The control of the remote system function is performed via one of the user's multiple IM instances being executed on a computing device located remotely from the user.

In another embodiment, any of the multiple user computing units 104, 106, 108 may include an agent program and be coupled to a data repository that includes a computer file that is requested to be sent as an IM attachment to one or more IM instances of an IM session.

Process for Improving Control of Multiple IM Instances

Figure 2A:
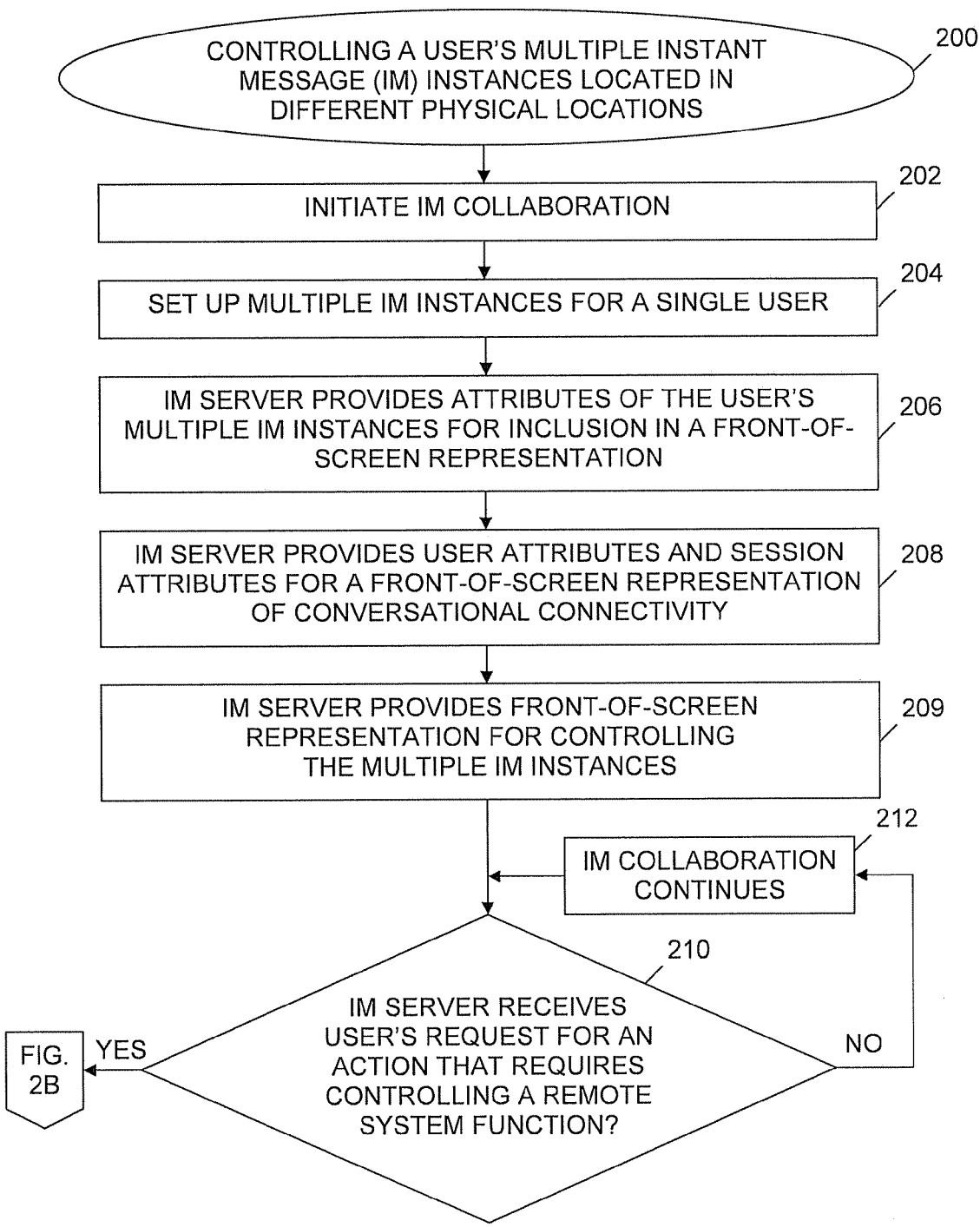

FIGS. 2A-2B depict a flow diagram of an instant message instances control process implemented in the system of FIG. 1, in accordance with embodiments of the present invention. The instant message instances control process begins at step 200 of FIG. 2A. In step 202, IM server 102 (see FIG. 1) initiates an IM session that provides a collaboration among a plurality of users. The IM session initiated in step 202 includes a plurality of IM instances that are owned by the plurality of users and that are being executed on a plurality of user computing devices (e.g., computing devices 104, 106, 108 of FIG. 1). In step 204, IM server 102 (see FIG. 1) sets up multiple IM instances that are owned by a single user of the plurality of users. That is, the multiple IM instances are included in the plurality of IM instances of the IM session and are logged on the IM session with identical credentials of the single user. The single user is physically using computing device 104 (see FIG. 1). As used herein, a user who is physically using a computing device is defined as a user who is utilizing the computing device with an input/output device (e.g., keyboard) that is coupled to the computing device directly or via an input/output interface included in the computing device. One of the multiple IM instances owned by the single user is being executed by computing device 104 (see FIG. 1), but the one or more other IM instances of the multiple IM instances are being executed by one or more other user computing devices of system 100 (see FIG. 1). Hereinafter, the single user that owns the multiple IM instances set up in step 204 is also referred to as "the user".

In step 206, instant messaging control engine 112 (see FIG. 1) retrieves attributes of the user's multiple IM instances (a.k.a. instance attributes) from the attributes database 114 (see FIG. 1) and IM server 102 (see FIG. 1) sends the instance attributes to the computing device that is being physically used by the user (i.e., computing device 104 of FIG. 1). The instance attributes sent in step 206 are included in a front-of-screen representation displayed on computing device 104 (see FIG. 1). By viewing the front-of-screen representation displayed on computing device 104 (see FIG. 1), the user is able to view instance attributes of any of the multiple IM instances owned by the user, including any remote IM instance that is executing on a computing device (e.g., computing device 106 of FIG. 1) that is located remotely from the user. Instance attributes of an IM instance that is owned by the user and is being executed on a computing device may include:

1. Information identifying the computing device that is executing the IM instance and/or the physical location of the computing device. Such information may include an Internet Protocol (IP) address of the computing device and/or a user-defined identifier of the physical location of the computing device (e.g., home office, secured office, client location, etc.);

2. A predefined security level of the physical location of the computing device that is executing the IM instance (e.g., public location, private location, highly secure location, etc.);

3. One or more classes of data that the computing device is permitted to present (e.g., display) to the user according to predetermined criteria (e.g., Confidential, Sensitive Personal, Private, Unclassified, Public, etc.);

4. A network connectivity restriction associated with the computing device (e.g., low bandwidth, cannot forward encrypted packets, etc.);

5. A display restriction based on a display characteristic of the computing device (e.g., screen size, audio or video capable, etc.); or 6. Information about whether the computing device is actively participating in the IM session.

In step 208, instant messaging control engine 112 (see FIG. 1) retrieves one or more attributes of each of the multiple users participating in the IM session (a.k.a. user attributes) and one or more attributes of the IM session (a.k.a. session attributes). Step 208 also includes IM server 102 (see FIG. 1) sending to each IM instance of the IM session the one or more user attributes and the one or more session attributes. The user attributes and session attributes sent in step 208 are included in a front-of-screen representation displayed on a plurality of user computing devices that are being used in the IM session. The front-of-screen representation that includes user and session attributes is a representation of conversation connectivity and allows any user of the plurality of users participating in the IM session to view session attributes, as well as user attributes of any other user of the plurality of users. The user attributes and session attributes sent in step 208 may include:

1. An identifier (e.g., name) of a user that owns an IM instance of the IM session;
2. An identifier (e.g., name) of a computing device of the plurality of user computing devices;
3. A current date and a time of the IM session; or
4. A geographic location of a user's computing device that is executing an IM instance of the IM session.

In one embodiment, a user participating in the IM session positions an onscreen pointer over a graphical element that represents an IM instance (i.e., uses a mouse-over function) to display (1) user attributes of the user who owns the IM instance and (2) session attributes of the IM session that includes the IM instance.

In one embodiment, the front-of-screen representation that includes user attributes and session attributes provides visibility for each user participating in an IM session to be aware of multiple computing devices that are logged on the IM session and that are owned by another user who is participating in the IM session. The location information associated with each of the user's multiple computing devices logged on the IM session may also be provided by the front-of-screen representation that includes user and session attributes.

In step 209, IM server 102 (see FIG. 1) provides to computing device 104 (see FIG. 1) a front-of-screen representation or graphical user interface (GUI) that allows the user to select an action that remotely manipulates one or more other IM instances that are owned by the user and that are participating in the IM session. The manipulation of one of the other IM instances provided by the front-of-screen representation or GUI of step 209 is performed without the user being physically present at the location that includes the computing device that is executing the other IM instance and without the user physically using the computing device that is executing the other IM instance.

In one embodiment, the GUI provided by step 209 presents a list of options that includes actions. Each action includes an interaction with a selected IM instance. Using the GUI provided by step 209, the user selects an IM instance and an action to interact with the selected IM instance. The selected action may include (1) remotely logging off of the selected IM instance, (2) sending an IM from the selected IM instance, (3) attaching a computer file from a data repository coupled to the computing device that is executing the selected IM instance, etc.

If IM server 102 (see FIG. 1) receives in step 210 the user's request for an action that requires controlling a remote system function via one of the user's multiple IM instances that is being executed on a computing device located remotely from the user, then the instant message instances control process continues with step 214 of FIG. 2B; otherwise, the collaboration provided by the IM session continues in step 212 of FIG. 2A, which is then followed by a repetition of step 210. The action requested in step 210 includes sending an IM to one or more IM instances of the IM session.

In step 214 of FIG. 2B, IM server 102 (see FIG. 1) sends a request to an agent program running on the computing device located remotely from the user (e.g., computing device 106 of FIG. 1). In step 216, the agent program initiates the remote system function required by the action requested by the user.

In step 218, the first IM instance that is to receive the IM that is sent as a result of the requested action is examined by instant messaging control engine 112 (see FIG. 1). Step 220 begins an iterative checking procedure. In step 220, for the IM instance being examined, instant messaging control engine 112 (see FIG. 1) retrieves one or more predefined rules from database 116 (see FIG. 1) and one or more attributes of an IM (a.k.a. IM attributes) from database 114 (see FIG. 1). The one or more predefined rules retrieved in step 220 are associated with the requested action that includes sending the IM to the IM instance being examined. The one or more predefined rules are also associated with a specific device type that describes the computing device that executes the IM instance being examined. Also in step 220, instant messaging control engine 112 (see FIG. 1) checks the one or more retrieved IM attributes against the one or more retrieved predefined rules. The check in step 220 results in inquiry step 222 determining whether or not the one or more retrieved predefined rules permit a completion of the requested action, which includes sending the IM to the IM instance being examined. The determination of whether the retrieved predefined rule(s) permit the sending of the IM is based on the one or more retrieved IM attributes and the type of computing device that is executing the IM instance being examined.

If step 222 determines that the check of step 220 allows the completion of the requested action, then IM server 102 (see FIG. 1) completes the requested action in step 224 in accordance with the predefined rule(s) by sending the IM to the IM instance being examined, as indicated in step 220.

If instant messaging control engine 112 (see FIG. 1) determines in step 226 that not all IM instances that are to receive the IM have been examined by the iterative checking procedure beginning at step 220, then the next IM instance is examined in step 228. That is, in step 228 the IM instance being examined is set to the next IM instance that is to receive the IM as a result of the requested action. Following step 228, the iterative checking procedure repeats starting at step 220.

Returning to step 222, if the check of step 220 does not allow the completion of the requested action and the IM instance being examined is not permitted to receive the IM according to the retrieved predefined rule(s), then in step 230, IM server 102 (see FIG. 1) sends an error message to the IM instance being examined and a status message to other IM instances of the IM session. The error message is displayed on the computing device that is executing the IM instance being examined and the status message is displayed on other computing devices that are running the other IM instances. The error message indicates that the IM instance receiving the error message is not permitted to receive the IM and the status message indicates which of the other IM instances are not permitted to receive the IM. The inquiry step 226 follows step 230.

Returning to step 226, if all IM instances to be examined have been examined by the iterative checking process, then the instant message instances control process ends at step 232.

EXAMPLES

For example, user X is participating in an IM collaboration initiated in step 202. User X is logged into 4 separate IM clients with the same credentials: a laptop in a home office, a smartphone, a desktop computer in the kitchen, and a server in a lab. That is, User X owns multiple IM instances of the IM collaboration, where the multiple IM instances are set up in step 204. User X is physically using the desktop computer in the kitchen. The desktop computer in the kitchen displays instance attributes for any of the multiple IM instances owned by User X, as well as conversational connectivity information that includes user attributes and session attributes (see steps 206 and 208). User X wants to send an IM from the server in the lab. User X uses the GUI provided in step 209 to select a graphical element associated with the IM instance being executed by the server in the lab. Upon selection of the IM instance being executed by the server in the lab, a list of options is presented to User X via the GUI. One of the options in the list includes an action to send an IM from a selected IM instance. User X selects the action to send an IM so that IM instances that are recipients of the IM will receive the IM from the server in the lab. Using the desktop computer in the kitchen, User X types the text of the IM via the GUI provided by step 209. Also via the GUI, User X directs IM server 102 (see FIG. 1) to send the IM from the IM instance being executed by the server in the lab (see step 210). The IM is then sent to the recipient IM instances from the server in the lab (see step 224).

As another example, resources associated with a computing device that is executing an IM instance of a user's multiple IM instances may be remotely controlled. In this example, consider that User X wants to send a computer file to multiple recipients who are participating in an IM session. User X owns multiple IM instances of the IM session. The computer file is stored in a data repository that is coupled to a remote computing device (i.e., a computing device that is remotely located relative to User X). The data repository is not coupled to the computing device being physically used by User X. Using the GUI provided in step 209, User X selects the IM instance being executed by the remote computing device. Using the GUI provided in step 209, User X selects an action to attach the computer file to an IM and to send the IM and its attachment to recipient IM instances. The GUI allows User X to locate the computer file in the data repository coupled to the remote computing device. The IM server 102 (see FIG. 1) receives a request to attach the computer file to an IM and to send the IM and its attachment (see step 210). The IM server sends the request to an agent program residing on the remote computing device (see step 214). The agent program fetches the computer file from the data repository (see step 216). In this example, each of the recipient IM instances is permitted to receive the IM and the attached computer file according to predefined rules (see steps 220 and 222). The IM server 102 sends the IM and the attached computer file to the recipient IM instances (see step 224).

Managing Multiple IM Instances

Figure 3:
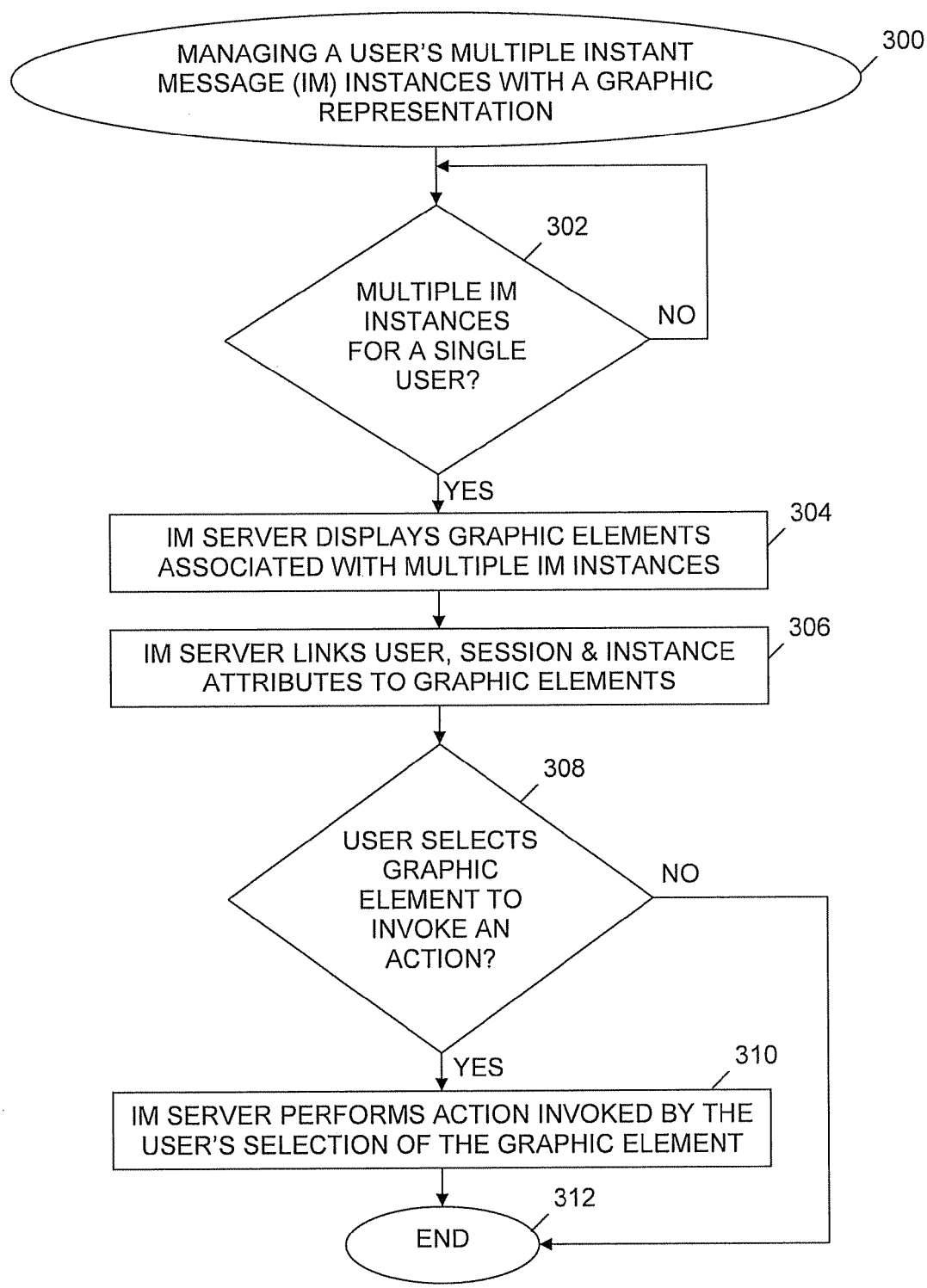
FIG. 3 is a flow diagram of a graphic-based multiple instant message instance management process included in the process of FIGS. 2A-2B, in accordance with embodiments of the present invention.

FIG. 3 is a flow diagram of a graphic-based multiple IM instances management process included in the process of FIGS. 2A-2B, in accordance with embodiments of the present invention. The process of managing multiple IM instances via a graphical representation begins at step 300. If instant messaging control engine 112 (see FIG. 1) determines in step 302 that multiple IM instances of an IM session are owned by the same user, then the process continues with step 304; otherwise, the IM session continues and step 302 is repeated.

In step 304, IM server 102 (see FIG. 1) initiates a display of an interactive, front-of-screen representation that includes multiple graphic elements that are associated with the multiple IM instances in a one-to-one correspondence. The front-of-screen representation is presented to the user via a computing device that the user is physically using. In step 306, IM server 102 (see FIG. 1) links user attributes, session attributes, and instance attributes to graphic elements included in the front-of-screen representation.

If instant messaging control engine 112 (see FIG. 1) determines in step 308 that the user selected a graphic element in the front-of-screen representation displayed in step 304, where the selection of the graphic element invokes an action, then the process continues with step 310; otherwise the process of FIG. 3 ends at step 312. A user selects a graphic element by, for example, positioning a cursor (i.e., hovering) over the graphic element. If the selected graphic element is associated with an IM instance, then information such as the physical location of the computing device that is executing the associated IM instance is displayed to the user via the front-of-screen representation. Other actions that the user may invoke in step 308 include, for example, adding a computing device as a potential participant in an IM session, removing a computing device from being a potential participant in an IM session, logging on an IM session via a specified computing device, and logging off an IM session via a specified computing device.

The front-of-screen representation displayed in step 304 may also provide, for example, the following information about an IM instance and a computing device that is executing the IM instance: IP address of the computing device, user-defined location of the computing device, a level of security associated with the physical location of the computing device, an identification of the computing device's type (e.g., cellular, Blackberry®, PC, etc.), the size and/or type of the Internet connection being used by the computing device (e.g., low bandwidth), the size of the display of the computing device (e.g., small display of a cell phone), etc.

In step 310, IM server 102 (see FIG. 1) performs the action invoked by the user's selection of the graphic element. Following step 310, the process of FIG. 3 ends at step 312.

FIG. 4 is a table 400 of exemplary rules that are applied to IM attributes and IM instance attributes during the process of FIGS. 2A-2B, in accordance with embodiments of the present invention. The information column of table 400 includes examples of attributes that are linked to graphic elements in step 306 of FIG. 3 and that are checked in step 220 of FIG. 2B. The rules column in table 400 include examples of predefined rules that are checked in step 220 of FIG. 2B.

For example, a user requests an action that includes sending an IM with an imbedded image to multiple IM instances of an IM session. A first IM instance of the IM session is being executed on a personal computer that has a high-bandwidth Internet connection. A second IM instance of the IM session is being executed on a cellular phone, which is an IM client whose type is Cellular according to table 400. A rule included in the last row of table 400 is checked to determine if the IM client type associated with the first IM instance is permitted to receive the IM being sent by the requested action. Similarly, the rule included in the last row of table 400 is checked (see step 220 of FIG. 2B) to determine if the IM client type associated with the second IM instance is permitted to receive the IM being sent by the requested action. The aforementioned rule permits the IM to be sent to the first IM instance because the rule states: "OK to send any message to a high-bandwidth connected PC". The same rule prevents the IM from being sent to the second IM instance because the rule further states: "but do not send messages with imbedded images or files to Cellular . . . ".

Figure 5:
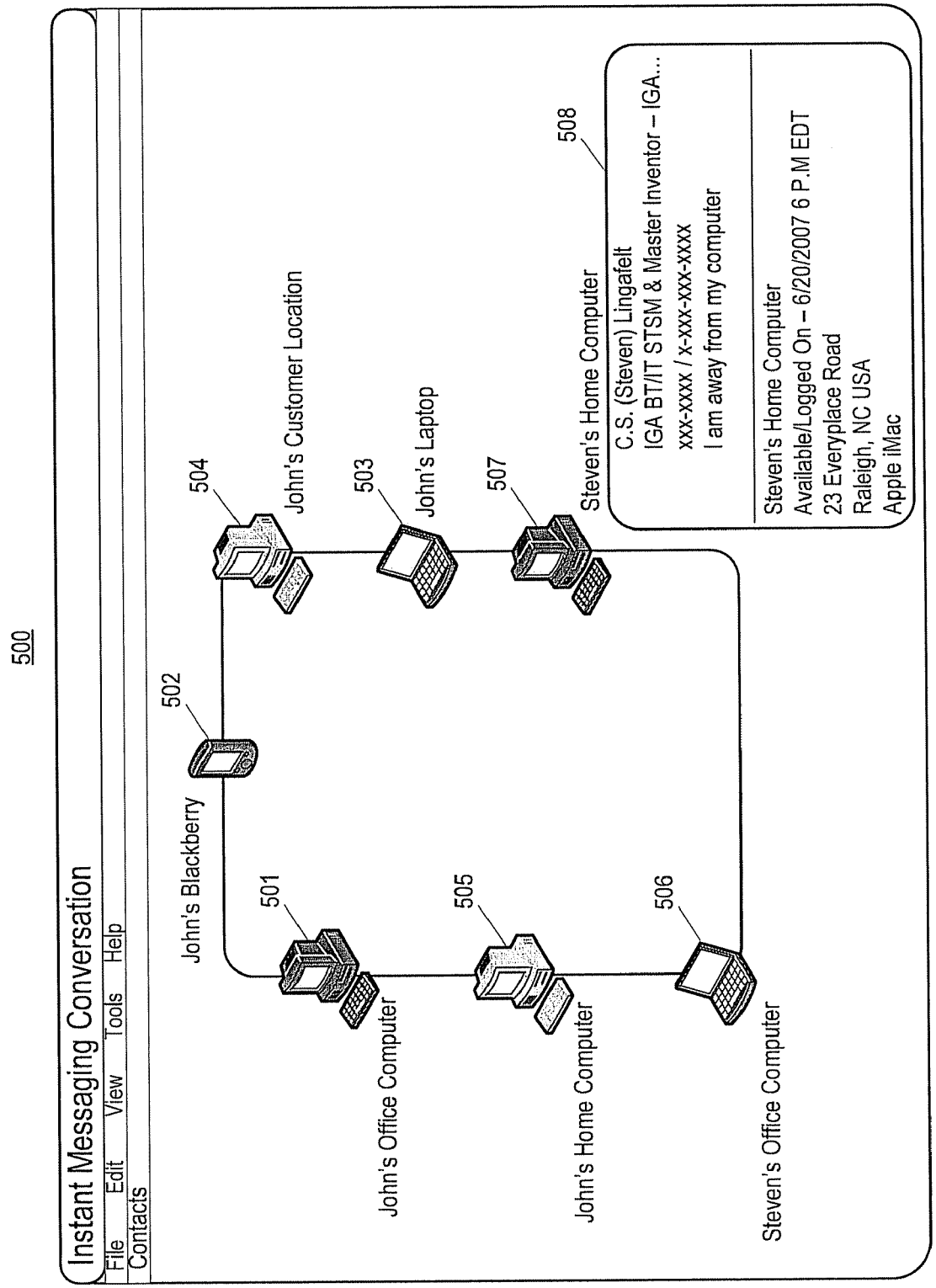
FIG. 5 is a screen image that includes an example of a graphic representation that includes conversational connectivity information in the process of FIGS. 2A-2B, in accordance with embodiments of the present invention.

FIG. 5 is a screen image that includes an example of a graphic representation that includes conversational connectivity information provided by step 208 of FIG. 2A. Screen image 500 includes graphic elements 501, 502, 503, 504, 505, 506 and 507 that represent computing devices, where each computing device is either executing an IM instance of an IM session (i.e., logged on the IM session) or is not logged on the IM session, but may potentially execute an IM instance of the IM session. Each of the graphic elements 501-507 is displayed as a normal icon or a "grayed" (i.e., lighter shaded) icon. The normal icons (e.g., John's Office Computer 501, John's Blackberry 502, John's Laptop 503, Steven's Office Computer 506 and Steven's Home Computer 507) represent computing devices that are logged on the IM session. The "grayed" icons (e.g., John's Customer Location 504 and John's Home Computer 505) represent computing devices that are not logged on the IM session.

The graphic representation displayed on screen image 500 facilitates management of the represented computing devices that are participating in the IM session. For example, the graphic representation provides each participant of the IM session with the ability to be aware of which computing devices are logged on the IM session and to view the geographic location of each computing device.

The graphic representation displayed on screen image 500 allows for the display of session attributes and user attributes relative to a user and a computing device owned by the user. The displayed user attributes may include, for example, the user's name, user's contact information, an indication of whether the user is currently at or away from the computing device, a name of the computing device, an indication of whether the computing device is available and logged on to the IM session, a date and time of the IM session, and a geographic location of the computing device.

In one embodiment, the session and user attributes are displayed in response to the user employing a mouse-over function. For example, a user employs a mouse-over function relative to the graphic element 507 to display the pop-up image 508, which includes session and user attributes related to the user of the computing device named Steven's Home Computer.

Defining Instant Message Attributes

Figure 6A:
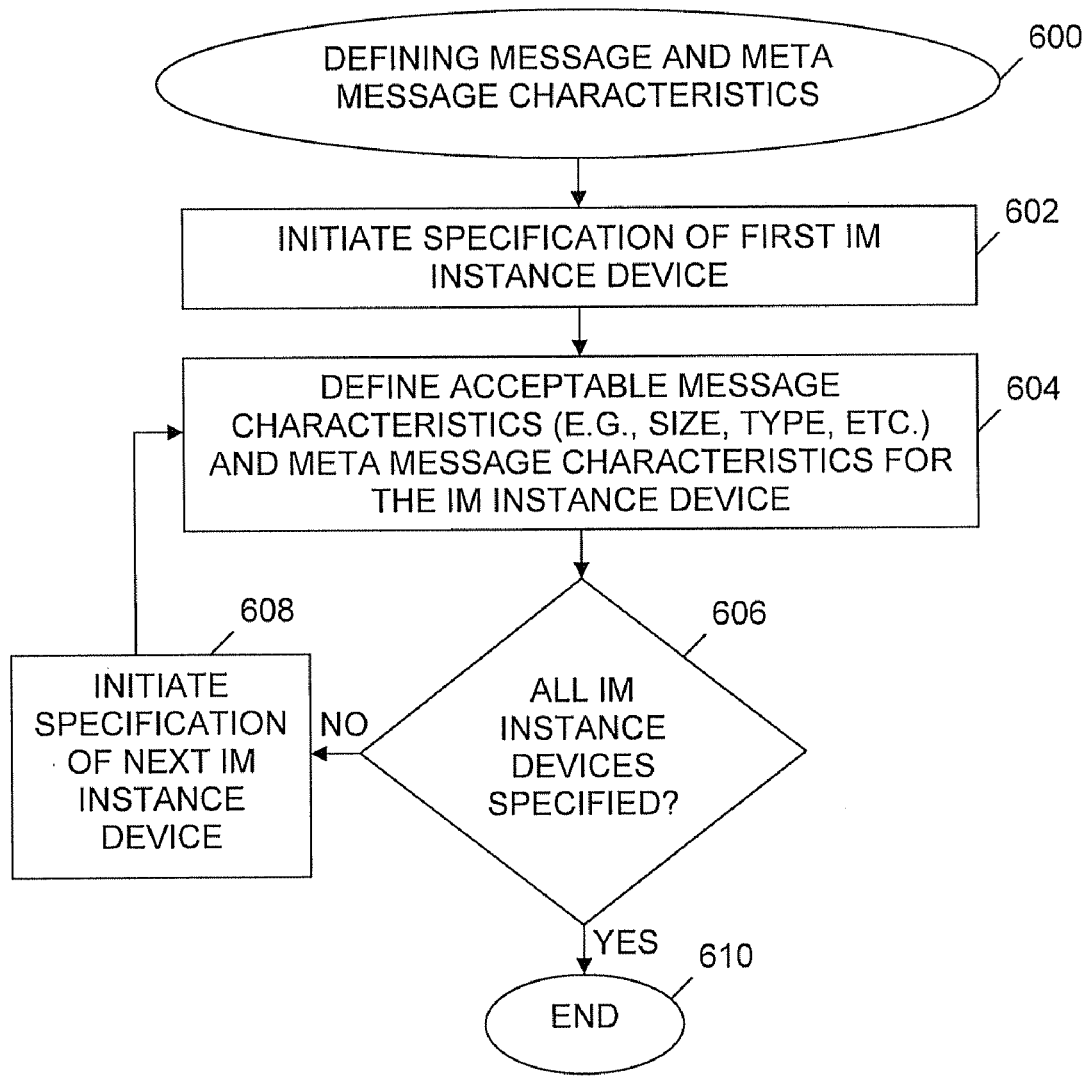
FIG. 6A is a flow diagram of a process of defining message characteristics and meta message characteristics analyzed by the system of FIG. 1, in accordance with embodiments of the present invention.

FIG. 6A is a flow diagram of a process of defining message characteristics (a.k.a message attributes) and meta message characteristics (a.k.a. meta message attributes) analyzed by the system of FIG. 1, in accordance with embodiments of the present invention. The process for defining message and meta message characteristics begins at step 600. In step 602, instant messaging control engine 112 (see FIG. 1) initiates a specification of a first computing device (a.k.a. IM instance device) that executes an IM instance of an IM session. In step 604, instant messaging control engine 112 (see FIG. 1) receives a definition of message characteristics (e.g., size of an instant message, instant message type, etc.) and meta message characteristics (e.g., the instant message's confidentiality or source) relative to a specified IM instance device. Herein, the acceptable message characteristics and meta message characteristics are also referred to collectively as IM attributes. IM server 102 (see FIG. 1) is permitted to send an IM to the specified IM instance device if the IM has IM attributes that are acceptable according to the definitions received in step 604.

If instant messaging control engine 112 (see FIG. 1) in step 606 determines that not all IM instance devices have been specified via step 604, then the instant messaging control engine initiates a specification of the next IM instance device in step 608 and the process repeats starting at step 604; otherwise, the process of FIG. 6A ends at step 610.

FIG. 6B is a table 650 of exemplary message characteristics and meta message characteristics defined by the process of FIG. 6A, in accordance with embodiments of the present invention. For example, an instant message is permitted to be sent to the IM instance device named Public PC (see the fourth data row of table 650) only if the message has the following attributes: the type of the message must be mp3, the size of the message must not exceed 25 KB, the latency associated with the message must not exceed 1000 ms, the jitter associated with the message must not exceed 1000 ms and the message content must not be classified as Confidential.

Exemplary Application of Rules to Message Attributes

Figure 7:
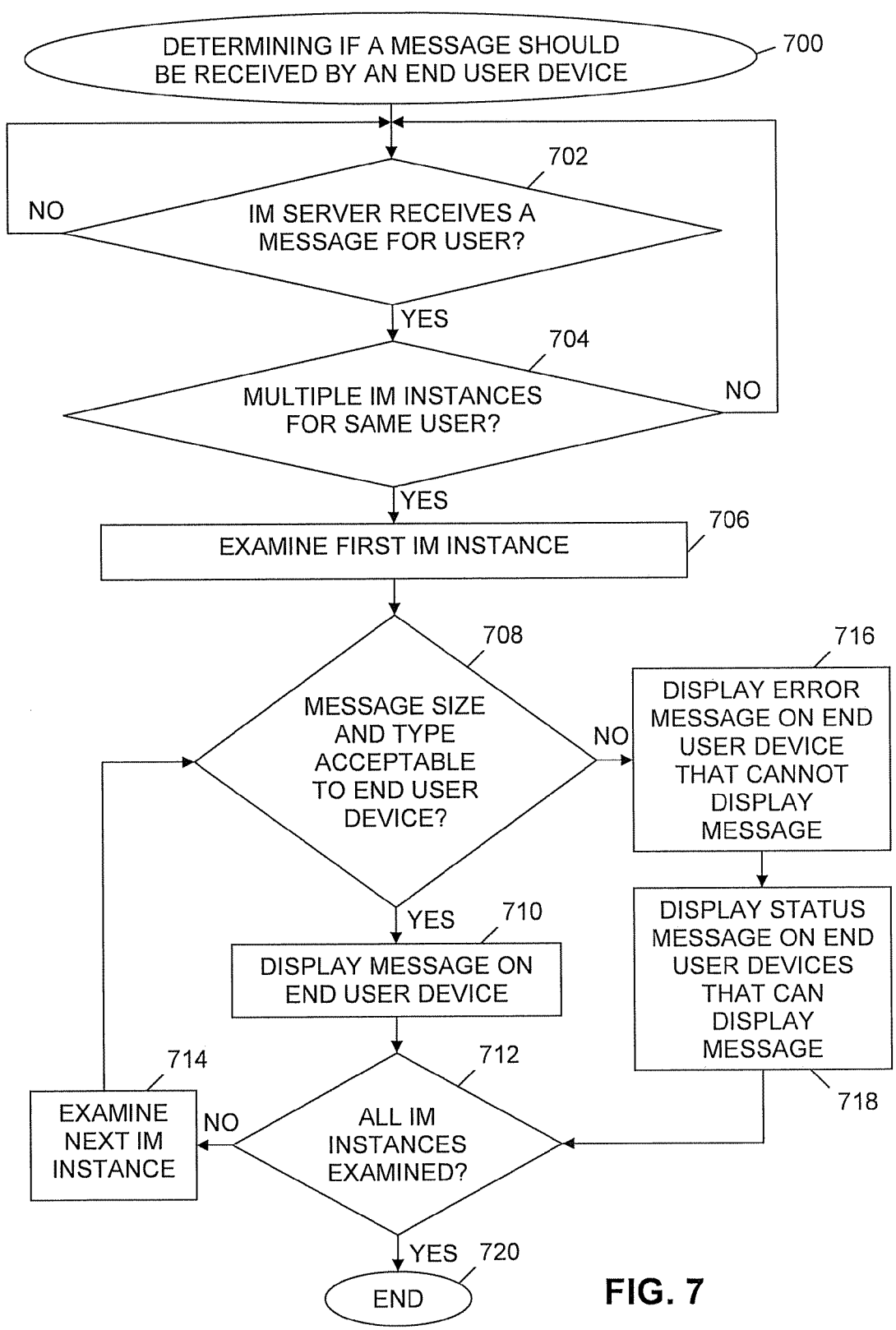
FIG. 7 is a flow diagram of an exemplary process of determining if a computing device should receive a message based on instant message attributes, where the process is implemented by the system of FIG. 1, in accordance with embodiments of the present invention.

FIG. 7 is a flow diagram of an exemplary process of determining if a computing device should receive a message based on IM attributes, where the process is implemented by the system of FIG. 1, in accordance with embodiments of the present invention. The process of determining if a computing device should receive an IM based on IM attributes begins at step 700. The IM in this section is also referred to as the message. If IM server 102 (see FIG. 1) receives in step 702 an IM that is directed to a user of a computing device that is executing an IM instance of an IM session, then the process of FIG. 7 continues with step 704; otherwise, the IM session continues and the process repeats step 702.

If instant messaging control engine 112 (see FIG. 1) determines in step 704 that multiple IM instances owned by the user are potential recipients of the IM, then the process of FIG. 7 continues with step 706; otherwise, the process repeats starting at step 702.

In step 706, instant messaging control engine 112 (see FIG. 1) examines the first IM instance of the multiple IM instances that were determined to be potential recipients of the IM. If instant messaging control engine 112 (see FIG. 1) determines in step 708 that the size of the message and/or the type of the message are acceptable to the computing device that is executing the IM instance currently being examined, then the IM server 102 (see FIG. 1) initiates in step 710 a display of the message on the computing device that is executing the IM instance currently being examined.

Prior to making the determination in step 708, instant messaging control engine 112 (see FIG. 1) retrieves (1) one or more message and/or meta message attributes of the IM from attributes database 114 (see FIG. 1), where the retrieved attributes includes the size and/or type of the IM and (2) one or more predefined rules from rules database 116 (see FIG. 1) that permit the sending of the IM to the IM instance currently being examined if the size of the IM is less than a predefined threshold size and/or if the type of the IM is a predefined type. The determination that results in following the Yes branch of step 708 includes the instant messaging control engine 112 (see FIG. 1) determining, based on the one or more retrieved attributes, that the one or more retrieved predefined rules permit sending the IM to the IM instance being currently examined. In the exemplary process of FIG. 7, determining that the one or more retrieved predefined rules permit the sending of the IM includes the instant messaging control engine determining that the size of the IM is less than a predefined threshold size and/or determining that the type of the IM is a predefined type.

For example, a predefined rule based on the message type and maximum size in the second data row of table 650 of FIG. 6B indicates that a computing device of the type Phone1 is permitted to receive an IM if the IM is of type .doc or mp3 and if the size of the IM does not exceed the predefined threshold size of 1 KB.

If instant messaging control engine 112 (see FIG. 1) determines in step 712 that not all IM instances of the multiple IM instances have been examined in the loop that begins at step 708, then in step 714, the instant messaging control engine examines the next IM instance and the process repeats starting at step 708. Thus, the IM instance currently being examined, which is used in the determination in step 708, is (1) the first IM instance if the loop starting at step 708 is in the first iteration of the loop or (2) the next IM instance referred to in the most recent performance of step 714 if the loop starting at step 708 is in an iteration subsequent to the first iteration.

Returning to step 708, if instant messaging control engine 112 (see FIG. 1) determines that the size of the message and the type of the message are not acceptable to the computing device that is executing the IM instance currently being examined, then IM server 102 (see FIG. 1) initiates in step 716 a display of an error message on the computing device that is not permitted to display the IM. The error message may indicate that the computing device is not permitted to receive the IM based on the application of the predefined rule(s) to the IM attribute(s).

In step 718, IM server 102 (see FIG. 1) initiates a display of a status message on one or more computing devices that are permitted to receive the IM. The status message may indicate that the status of which computing devices have successfully received the IM and which computing devices are not permitted to receive the IM based on the application of the predefined rule(s) to the IM attribute(s). Step 712 follows step 718. The No branch of step 712 is described above.

Returning to step 712, if instant messaging control engine 112 (see FIG. 1) determines that all IM instances of the multiple IM instances have been examined in the loop that begins at step 708, then the process of FIG. 7 ends at step 720.

Computing System

Figure 8:
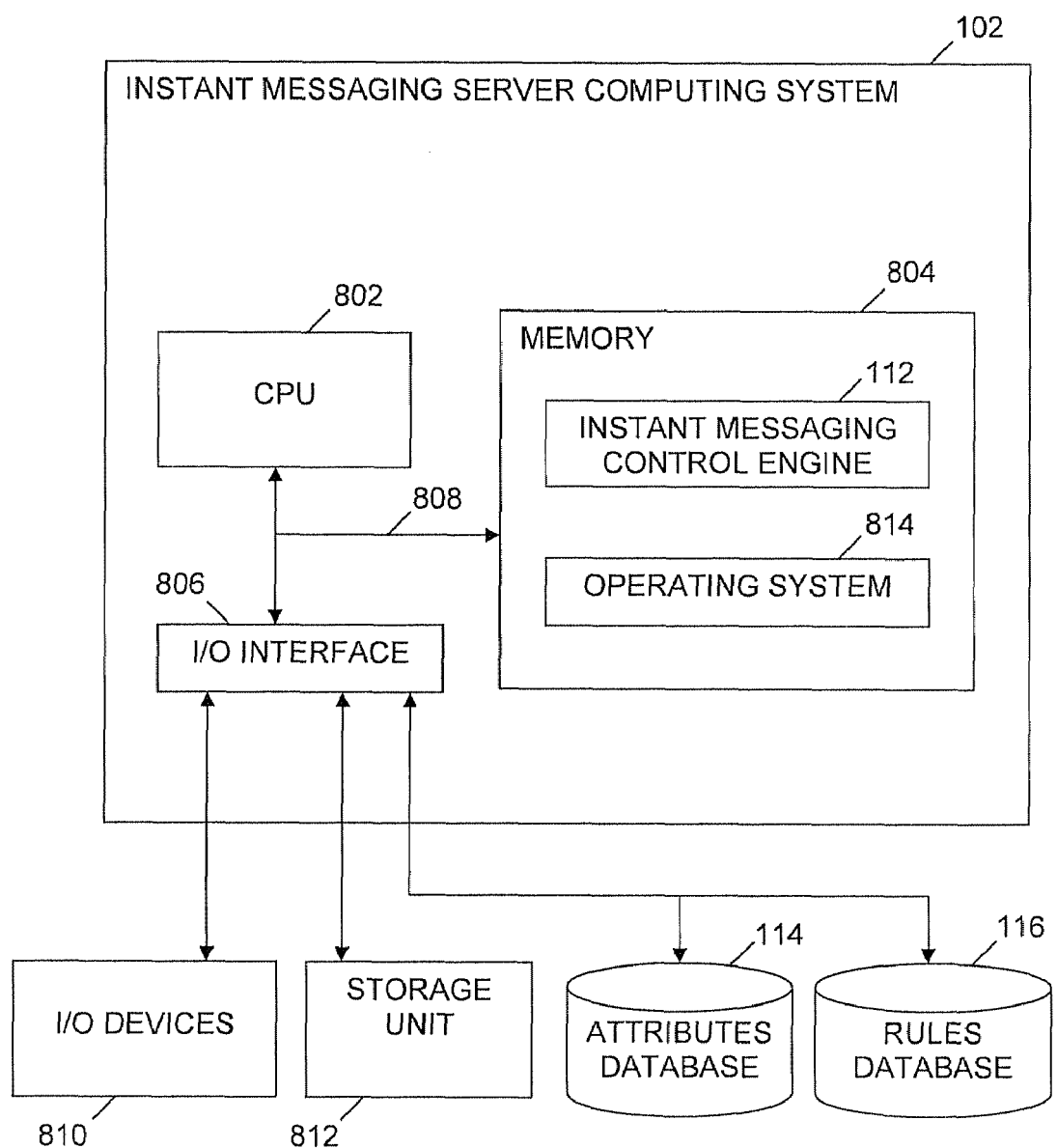
FIG. 8 is a block diagram of a computing system that is included in the system of FIG. 1 and that implements the process of FIGS. 2A-2B, in accordance with embodiments of the present invention.

FIG. 8 is a block diagram of a computing system that is included in the system of FIG. 1 and that implements the process of FIGS. 2A-2B, in accordance with embodiments of the present invention. Instant messaging server computing system 102 (a.k.a. computing system 102) generally comprises a CPU 802, a memory 804, an input/output (I/O) interface 806, and a bus 808. Computing system 102 is coupled to I/O devices 810, storage unit 812, and one or more data repositories that include attributes database 114 and rules database 116. CPU 802 performs computation and control functions of computing system 102. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Cache memory elements of memory 804 provide temporary storage of at least some program code in order to reduce the number of times code must be retrieved from bulk storage during execution. Memory 804 may also store an instant message or a computer file attached to an instant message that is received from one user computing unit (e.g., computing unit 104, 106 or 108 of FIG. 1) and is sent to another user computing unit via an action requested in the process of FIGS. 2A-2B. Storage unit 812 is, for example, a magnetic disk drive or an optical disk drive that stores data that may include an instant message or a computer file attached to an instant message that is received from one user computing unit (e.g., computing unit 104, 106 or 108 of FIG. 1) and is sent to another user computing unit via an action requested in the process of FIGS. 2A-2B. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including but not limited to a display monitor, keyboard, pointing device, speakers, handheld device, printer, facsimile, etc. I/O devices can be coupled to computing system 102 directly or through I/O interface 806. Bus 808 provides a communication link between each of the components in computing system 102, and may comprise any type of transmission link, including electrical, optical, wireless, etc.

I/O interface 806 also allows computing system 102 to store and retrieve information (e.g., program instructions or data) from an auxiliary storage device (e.g., storage unit 812). Data retrieved via I/O interface 806 may include an instant message or a computer file attached to an instant message that is received from one user computing unit (e.g., computing unit 104, 106 or 108 of FIG. 1) and is sent to another user computing unit via an action requested in the process of FIGS. 2A-2B. The auxiliary storage device may be a non-volatile storage device (e.g., a CD-ROM drive which receives a CD-ROM disk). Computing system 102 can store and retrieve information from other auxiliary storage devices (not shown), which can include a direct access storage device (DASD) (e.g., hard disk), a magneto-optical disk drive, a tape drive, or a wireless communication device.

Memory 804 includes program code for instant messaging control engine 112 for improving control of an IM system. Memory 804 also includes an operating system (e.g., Linux) 814. Further, memory 804 may include other systems not shown in FIG. 8.

Instant messaging control engine 112 can take the form of an entirely hardware embodiment, an entirely software embodiment or an embodiment containing both hardware and software elements. In one embodiment, instant messaging control engine 112 is implemented in software, which includes but is not limited to firmware, resident software, microcode, etc.

Furthermore, instant messaging control engine 112 can take the form of a computer program product accessible from a computer-usable or computer-readable medium providing program code for use by or in connection with a computing system 102 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic-based, magnetic-based, optical-based, electromagnetic-based, infrared-based, or semiconductor-based system (or apparatus or device). Examples of a computer-readable medium include a semiconductor or solid state memory, magnetic tape, a removable computer diskette, RAM, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of improving control of an IM system. Thus, the present invention discloses a process for supporting computer infrastructure, comprising integrating, hosting, maintaining and deploying computer-readable code into a computing system (e.g., computing system 102), wherein the code in combination with the computing system is capable of performing a method of improving control of an IM system.

In another embodiment, the invention provides a business method that performs the process steps of the invention on a subscription, advertising and/or fee basis. That is, a service provider, such as a Solution Integrator, can offer to create, maintain, support, etc. a method of improving control of an IM system. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of improving control of an instant messaging system, comprising:
    initiating, by a computing system, multiple instant message (IM) instances with identical credentials of a first user of a plurality of users participating in an IM session, wherein said multiple IM instances are included in a plurality of IM instances of said IM session, and wherein said plurality of IM instances are being executed by a plurality of computing devices;
    receiving, by said computing system, from said first user, via a first IM instance of said multiple IM instances, and subsequent to said initiating, a selection of a graphical element of a plurality of graphical elements representing said plurality of IM instances, wherein said graphical element represents a remote IM instance of said multiple IM instances, and wherein said remote IM instance is different from said first IM instance;
    receiving, by said computing system, an IM from said first user via said first IM instance;
    receiving, by said computing system, from said first user, via said first IM instance and subsequent to said receiving said selection of said graphical element, a selection of an action of a list of actions, wherein said receiving said selection of said action includes receiving a request to perform said action by a remote computing device of said plurality of computing devices, wherein said remote computing device is located remotely from said first user, and wherein said remote computing device is executing said remote IM instance, wherein said receiving said request to perform said action includes receiving a request to send said IM from said remote IM instance to an IM instance other than said multiple IM instances, wherein said IM instance is included in said plurality of IM instances, wherein said performing said action includes sending said IM to said IM instance, wherein said IM instance is owned by a second user of said plurality of users, and wherein said second user is different from said first user; and
    performing said action by said computing system, wherein said performing said action includes controlling a remote system function of said remote computing device.

2. The method of claim 1, further comprising:
    retrieving, by said computing system, one or more attributes of said IM;
    retrieving, by said computing system, one or more predefined rules for permitting said sending said IM to said IM instance; and
    determining, by said computing system, that said one or more predefined rules permit said sending said IM to said IM instance, wherein said determining is based on said one or more attributes.

3. The method of claim 2, wherein said one or more attributes includes a size of said IM, wherein said one or more predefined rules permits said sending said IM to said IM instance if said size of said IM is less than a predefined threshold size, and wherein said determining that said one or more predefined rules permits said sending includes determining that said size of said IM is less than said predefined threshold size.

4. The method of claim 2, wherein said one or more attributes includes a type of said IM, wherein said one or more predefined rules permits said sending said IM to said IM instance if said type of said IM is a predefined type, and wherein said determining that said one or more predefined rules permits said sending includes determining that said type of said IM is said predefined type.

5. The method of claim 1, wherein said controlling said remote system function includes sending, by said computing system, to an agent program residing on said remote computing device, and in response to said receiving said request to perform said action, a request for an execution of said remote system function by said agent program, wherein said execution of said remote system function facilitates said performing said action.

6. The method of claim 5, wherein said execution of said remote system function by said agent program is selected from the group consisting of a remote log-off of said remote IM instance to remove said remote IM instance from said IM session, a remote log-on of an IM instance to add said IM instance to said IM session, a remote sending of an IM from said remote IM instance to one or more IM instances of said plurality of IM instances, and a remote sending of a computer file to one or more IM instances of said plurality of IM instances.

7. The method of claim 6, wherein said execution of said remote system function by said agent program is said remote sending of said computer file to said one or more IM instances of said plurality of IM instances,
    wherein said sending said request for said agent program to initiate said execution of said remote system function includes sending a request for said agent program to retrieve said computer file from a data repository coupled to said remote computing device,
    wherein said controlling said remote system function further includes retrieving said computer file from said data repository subsequent to said sending said request to retrieve said computer file, and receiving said computer file by said computing system and subsequent to said retrieving said computer file from said data repository, and
    wherein said performing said action includes sending said computer file to said one or more IM instances of said plurality of IM instances, wherein said one or more instances are not included in said multiple IM instances.

8. The method of claim 1, further comprising sending, by said computing system, to a first computing device of said plurality of computing devices, and subsequent to said initiating, a front-of-screen representation that includes a plurality of instance attributes of said multiple IM instances, wherein said first computing device is executing said first IM instance, and wherein said first user is physically located at said first computing device.

9. The method of claim 8, wherein said front-of-screen representation includes information about said first computing device, wherein said information is selected from the group consisting of:
- an Internet Protocol address of said first computing device,
- a physical location of said first computing device,
- a predefined security level of a said physical location,
- one or more classes of data that said first computing device is permitted to present to said first user according to predetermined criteria,
- a restriction based on a type of network connectivity associated with said first computing device, and
- a restriction based on a display characteristic or audio characteristic associated with said first computing device.

10. The method of claim 1, further comprising sending, by said computing system, to said plurality of computing devices, and subsequent to said initiating, a front-of-screen representation that includes a plurality of user attributes of said plurality of users and one or more session attributes of said IM session.

11. The method of claim 10, wherein said front-of-screen representation includes information about said plurality of users and said IM session, wherein said information is selected from the group consisting of:
- a name of a user of said plurality of users,
- a name of a computing device of said plurality of computing devices, wherein said computing device is owned by said user in said IM session,
- a date and a time of said IM session, and
- a geographic location of said user.

12. A computing system comprising a processor and a computer-readable memory unit coupled to said processor, said memory unit containing instructions that when executed by said processor implement a method of improving control of an instant messaging system, said method comprising:
- initiating multiple instant message (IM) instances with identical credentials of a first user of a plurality of users participating in an IM session, wherein said multiple IM instances are included in a plurality of IM instances of said IM session, and wherein said plurality of IM instances are being executed by a plurality of computing devices;
- receiving, from said first user, via a first IM instance of said multiple IM instances, and subsequent to said initiating, a selection of a graphical element of a plurality of graphical elements representing said plurality of IM instances, wherein said graphical element represents a remote IM instance of said multiple IM instances, and wherein said remote IM instance is different from said first IM instance;
- receiving an IM from said first user via said first IM instance;
- receiving, from said first user, via said first IM instance and subsequent to said receiving said selection of said graphical element, a selection of an action of a list of actions, wherein said receiving said selection of said action includes receiving a request to perform said action by a remote computing device of said plurality of computing devices, wherein said remote computing device is located remotely from said first user, and wherein said remote computing device is executing said remote IM instance, wherein said receiving said request to perform said action includes receiving a request to send said IM from said remote IM instance to an IM instance other than said multiple IM instances, wherein said IM instance is included in said plurality of IM instances, wherein said performing said action includes sending said IM to said IM instance, wherein said IM instance is owned by a second user of said plurality of users, and wherein said second user is different from said first user; and
- performing said action, wherein said performing said action includes controlling a remote system function of said remote computing device.

13. The system of claim 12, further comprising:
- retrieving one or more attributes of said IM;
- retrieving one or more predefined rules for permitting said sending said IM to said IM instance; and
- determining that said one or more predefined rules permit said sending said IM to said IM instance, wherein said determining is based on said one or more attributes.

14. A computer program product, comprising a computer usable medium having a computer readable program code embodied therein, said computer readable program code containing instructions that when executed by a processor of a computing system implement a method of improving control of an instant messaging system, said method comprising:
- initiating multiple instant message (IM) instances with identical credentials of a first user of a plurality of users participating in an IM session, wherein said multiple IM instances are included in a plurality of IM instances of said IM session, and wherein said plurality of IM instances are being executed by a plurality of computing devices;
- receiving, from said first user, via a first IM instance of said multiple IM instances, and subsequent to said initiating, a selection of a graphical element of a plurality of graphical elements representing said plurality of IM instances, wherein said graphical element represents a remote IM instance of said multiple IM instances, and wherein said remote IM instance is different from said first IM instance;
- receiving an IM from said first user via said first IM instance;
- receiving, from said first user, via said first IM instance and subsequent to said receiving said selection of said graphical element, a selection of an action of a list of actions, wherein said receiving said selection of said action includes receiving a request to perform said action by a remote computing device of said plurality of computing devices, wherein said remote computing device is located remotely from said first user, and wherein said remote computing device is executing said remote IM instance, wherein said receiving said request to perform said action includes receiving a request to send said IM from said remote IM instance to an IM instance other than said multiple IM instances, wherein said IM instance is included in said plurality of IM instances, wherein said performing said action includes sending said IM to said IM instance, wherein said IM instance is owned by a second user of said plurality of users, and wherein said second user is different from said first user; and
- performing said action, wherein said performing said action includes controlling a remote system function of said remote computing device.

15. The program product of claim 14, further comprising:
retrieving one or more attributes of said IM;
retrieving one or more predefined rules for permitting said sending said IM to said IM instance; and
determining that said one or more predefined rules permit said sending said IM to said IM instance, wherein said determining is based on said one or more attributes.

16. The program product of claim 15, wherein said one or more attributes includes a size of said IM, wherein said one or more predefined rules permits said sending said IM to said IM instance if said size of said IM is less than a predefined threshold size, and wherein said determining that said one or more predefined rules permits said sending includes determining that said size of said IM is less than said predefined threshold size.

17. The program product of claim 15, wherein said one or more attributes includes a type of said IM, wherein said one or more predefined rules permits said sending said IM to said IM instance if said type of said IM is a predefined type, and wherein said determining that said one or more predefined rules permits said sending includes determining that said type of said IM is said predefined type.

* * * * *